United States Patent
Hoene

(10) Patent No.: US 8,151,969 B2
(45) Date of Patent: Apr. 10, 2012

(54) BAGGAGE CONVEYING SYSTEM

(75) Inventor: Albrecht Hoene, Lappersdorf (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 12/903,647

(22) Filed: Oct. 13, 2010

(65) Prior Publication Data

US 2011/0088996 A1     Apr. 21, 2011

(51) Int. Cl.
*B65G 47/10* (2006.01)
(52) U.S. Cl. .............................. 198/370.08; 198/370.07
(58) Field of Classification Search .............. 198/370.01, 198/370.07, 370.08
See application file for complete search history.

(56) References Cited

U.S. PATENT DOCUMENTS

| | | | |
|---|---|---|---|
| 6,588,575 B1 * | 7/2003 | Heuft et al. .............. | 198/370.07 |
| 7,261,198 B2 * | 8/2007 | Tatar et al. ............... | 198/370.02 |
| 7,331,441 B2 * | 2/2008 | Persson ..................... | 198/370.08 |
| 7,735,625 B2 * | 6/2010 | Schafer .................... | 198/370.09 |
| 2002/0157919 A1 * | 10/2002 | Sherwin .................... | 198/370.01 |
| 2006/0254880 A1 * | 11/2006 | Van Schaijk et al. .... | 198/370.08 |

FOREIGN PATENT DOCUMENTS

| | | |
|---|---|---|
| DE | 20 2008 009 280 U1 | 9/2008 |
| EP | 1 388 510 A1 | 2/2004 |
| WO | 2010/003392 A1 | 1/2010 |

* cited by examiner

*Primary Examiner* — James R Bidwell
(74) *Attorney, Agent, or Firm* — Wood, Herron & Evans, LLP

(57) ABSTRACT

A transport system for piece goods includes a conveyor for moving the piece goods along a conveying path, an unloading device including a multi-axis manipulator for unloading piece goods from the conveyor, and a clearing tool. The clearing tool is moved relative to the conveyor by the multi-axis manipulator to discharge a piece good from the conveyor, and the movement of the clearing tool includes a directional component transverse to the direction of movement of the conveying path and a directional component in the direction of movement of the conveying path.

20 Claims, 3 Drawing Sheets

BAGGAGE CONVEYING SYSTEM

TECHNICAL FIELD

The invention relates to a transport system for piece goods, having a conveyor system with at least one piece goods carrier moved by the conveyor system and an unloading device for removing the piece goods from the at least one piece goods carrier at an unloading point. The invention also relates to an associated method for unloading piece goods from a piece goods carrier of a conveyor system at an unloading point, and to a utilization for that purpose in luggage conveyor systems.

BACKGROUND

EP 1 388 510 A1 describes a transport system for piece goods containers, in particular for luggage containers on an essentially horizontal conveyorway having at least two conveyors spaced apart, of which at least one conveyor is driven, as well as having at least one device for unloading the piece goods, using gravity by tilting the piece goods container into an unloading position transverse to its transport direction. A running rail loop runs in space so that the piece goods container while being transported is lifted on one side from the adjacent conveyor by the device by means of the positively guided coupling element and is rotated into its tilted position.

DE 20 2008 009 280 U1 describes a conveyor device having a number of transport units that are movable along a guiding apparatus. The conveyor device described there, having a number of transport units movable along a guiding apparatus, has on its top side a push-off device that is drivable contrary to a travel direction of the transport units, for gentle loading and/or discharging of pieces of cargo.

SUMMARY

The object of the invention is to provide a transport system for piece goods, wherein the piece goods are removed from the piece goods carrier at their unloading point in an improved manner.

The problem of the invention is solved by a transport system for piece goods, having a conveyor system with at least one piece goods carrier moved by the conveyor system and an unloading device for removing the piece goods from the at least one piece goods carrier at an unloading point, wherein the unloading device is constituted by a freely programmable manipulator positioned at the unloading point.

The freely programmable manipulator is set up in this case to remove each piece of cargo arriving at the unloading point from the piece goods carrier by moving the manipulator. The use of a freely programmable manipulator results on the one hand in there being no need to have unloading devices on the piece goods carriers or conveyed along with them, and on the other hand in the ability to operate on the piece goods with differing motion sequences of the manipulator as needed, depending on the piece goods delivered by the particular piece goods carrier, in order to remove them from the piece goods carrier. Because the plurality of piece goods carrier-based unloading devices known from the existing art are replaced according to the invention by a single manipulator at the unloading point, it is possible to save as many unloading devices as there are piece goods carriers circulating in the transport system—except for one.

For example, at airports, transport containers are employed in luggage conveyor systems in order to transport the cargo, for example air travel luggage, gently and rapidly, so that luggage traveling with the passengers can be transloaded quickly at connection airports, and the passengers can take advantage of their connecting flights faster. Uniform conveyor performance and a high degree of system availability are also required. The transport containers are loaded either from above or from the side. Loading from above has the disadvantage that the cargo, i.e., the luggage, falls into the transport container from above, causing very severe wear on the transport containers over time. Loading from the side requires active conveyor devices, which had to be provided heretofore on each individual transport container. These are for example tilting devices or lateral conveyor belts. The transport containers become complex and expensive, due to the high cost of conveyor devices for each transport container. The transport containers are unloaded in this case using these active conveyor devices, or else the entire container must be tilted. It is often necessary to this end to implement complicated gripping mechanisms, such as clamps or permanent magnets. Besides these gripping mechanisms and the transport containers, often substantial portions of the conveyor system components are also tilted. This has the disadvantage that heavy structural elements must be moved, or that energy and/or data must be transferred to moving parts. This also results in significant wear. With many systems of this sort the conveyer system must be stopped during the tilting, which limits the throughput of the conveyor lines. With problematic cargo, such as wet leather suitcases, it is sometimes not possible to overcome the cohesive friction despite tilting the transport container, so that the cargo, i.e., the suitcase, remains in the transport container and thus causes a disruption.

The invention provides a robot-based solution.

Instead of expensive emptying mechanisms, a robot, whose sequence of movements can be synchronized with the movement of the container, clears off the loaded piece goods carrier, for example a tray, in particular for suitcases. The robot can carry as a tool a simply designed sliding device. The sliding device can be designed as a push broom. The horizontal sliding direction can be perpendicular to the motion of the container, from the perspective of the moving container. The shape and size of the sliding device can be adapted to the shape of the container, which makes it possible to ensure that even small pieces of cargo are unloaded reliably.

The transport system according to the invention can offer advantages through the fact that the transport system can be supplied inexpensively, can easily be retrofitted, or can be adapted in a simple manner to changed conditions for transported and/or conveyed goods. At the same time, discharge is possible at many or various locations of the conveyor system, on both the left and right sides. It is possible to achieve an increase in throughput with the transport system according to the invention, since it may not be necessary to stop the piece goods carriers. Increased throughput means greater line capacity and therefore less space needed for the total system. The unloading can be done with greater reliability. The clearing speed and acceleration can be set individually. For example, the transport system can be adapted to the properties of the goods being transported, such as weight, size, sensitivity or the current transport speed. In addition, the chute width can be reduced because of the greater precision of the freely programmable manipulator, so that less space is needed for the transport system. The transported goods are handled more gently due to the discharge using a freely programmable manipulator. Additionally, robot-based loading is also possible. Analogously to the unloading of the containers, loading by the freely programmable manipulator is also possible. The clearing tool can be adapted mechanically for that purpose.

A clearing tool for removing the piece goods from their piece goods carriers, in particular for discharging them onto a removal device at the unloading point, can be combined with the freely programmable manipulator. The clearing tool can be adapted to the size, shape and contour of the piece goods carriers. So with a piece goods carrier that is at least approximately flat and for example rectangular, the clearing tool can be constituted of a flat slide, which extends across the width of the piece goods carrier and is oriented essentially perpendicular to the floor of the piece goods carrier. If the piece goods carrier is shaped differently, the clearing tool can have a correspondingly adapted shape. In particular, the clearing tool can be adapted to the piece goods carrier in such a way that even very small piece goods are also unloaded reliably.

The clearing tool can be actuated by the freely programmable manipulator to push off, in particular in a direction transverse to the transport direction of the conveyor system. In principle, the clearing tool can clear the piece goods from the piece goods carrier using any sequence of motions. In a specific embodiment, the clearing tool can be set up to push the piece goods off. Pushing off can be accomplished for example by the clearing tool having a slide which strokes above or along the surface of the piece goods carrier from one side of the piece goods carrier to the other side, and in so doing carries the piece goods with it, i.e., pushes them ahead of it, and forces them off the piece goods carrier.

In all designs it is possible to combine a clearing tool with the freely programmable manipulator, whose motion is synchronized with the piece goods carrier to be cleared, which is being moved by the conveyor system. That enables the piece goods to be unloaded even when the particular piece goods carrier that is passing the unloading point is in motion. As a result, stopping and restarting the piece goods carrier can be eliminated, so that the transport system is in motion without interruption and is constantly available.

In one design, the clearing tool can be synchronized with the piece goods carrier by a motion of the axes of the freely programmable manipulator. In the case of a stationary manipulator, i.e., one that is positioned immovably at the unloading point, the clearing tool alone can be synchronized to the motion of the piece goods carrier by moving the axes of the freely programmable manipulator. With synchronization of this sort the clearing tool executes a motion not only with a directional component transverse to the direction of motion of the piece goods carrier, but also with a directional component in the direction of motion of the piece goods carrier, and in particular at the same velocity as the piece goods carrier.

In one design, additionally or alternatively the transport system can include a linear axis, and the clearing tool can be synchronized with the piece goods carrier by a motion of the linear axis on which the freely programmable manipulator is movably supported. In that way the clearing tool can be synchronized with the piece goods carrier by superimposing motions of the axes of the freely programmable manipulator and the motion of the linear axis. In a specific design, the directional component transverse to the direction of motion of the piece goods carrier can be generated solely by the motions of the axes of the freely programmable manipulator, and the directional component in the direction of motion of the piece goods carrier solely by the motion of the linear axis. Alternatively, a mixed motion from the axes of the freely programmable manipulator and the linear axis can also be produced.

A method according to the invention for unloading piece goods from a piece goods carrier of a conveyor system at an unloading point, in particular using one of the described transport systems, provides the following steps:

Transporting the piece goods located on at least one piece goods carrier of the conveyor system to the unloading point, and clearing the piece goods from the piece goods carrier using a clearing tool that is guided by the freely programmable manipulator positioned at the unloading point.

In a refinement of the method, clearing of the piece goods from a piece goods carrier that is in motion can be accomplished by a clearing tool that is guided by a freely programmable manipulator positioned at the unloading point, by a motion of the manipulator that is synchronized with the motion of the piece goods carrier.

The motion of the clearing tool that is synchronized with the motion of the piece goods carrier can be executed by actuating the axes of the manipulator.

Alternatively or in addition, the motion of the clearing tool that is synchronized with the motion of the piece goods carrier can be executed by actuating the motion of a linear axis on which the manipulator is movably supported.

The motion of the clearing tool that is synchronized with the motion of the piece goods carrier can be executed by superimposed actuation of the axes of the manipulator and actuation of the motion of the linear axis.

In all variants of the method according to the invention, the motion of the manipulator can be executed with different travel conditions for the motion of the clearing tool depending on a feature of the piece goods to be cleared, in particular on the basis of data of the piece goods that are registered by a measuring and/or identification system. For example, a detecting device can be provided in the transport system which registers data of the piece goods and possibly passes said data on, so that the motion of the manipulator can be adapted on the basis of the data. The detecting device, or the measuring and identification system, can be provided on the manipulator or can be attached to it. For example, the piece goods can be provided with transponders or RFID tags for that purpose.

Thus for example at least one travel condition from the group of travel path, velocity and acceleration can be changed or adapted to the adapted movement of the clearing tool depending on a feature of the piece goods to be cleared. Depending on whether the item is for example a very strong hard-shell suitcase or a soft fabric bag, in the exemplary case of the hard-shell suitcase the clearing tool can be guided more rapidly and the hard-shell suitcase removed from the piece goods carrier with greater force, or in the exemplary case of the fabric bag the clearing tool can be guided more slowly and the fabric bag removed from the piece goods carrier with less force. At the same time, there can also be provision for reducing the velocity of the piece goods carrier according to the feature of the piece goods to be cleared.

In all variants of the method according to the invention, the motion of the manipulator can be executed with different travel conditions for the motion of the clearing tool depending on a feature of the piece goods carrier to be cleared, in particular depending on the shape of the piece goods carrier. For example, the shape of the piece goods carrier can be taken into account in the unloading motion, in order to unload the piece goods gently. For example, the robot or manipulator can make allowance for a convex bowl shape of the piece goods carrier, whereby the reliability of unloading is increased.

The motion of the manipulator with different travel conditions for the motion of the clearing tool can be executed depending on at least one feature of the piece goods to be cleared, from the group of shape, dimensions, mass and sensitivity to impact of the piece goods.

The methods according to the invention can be employed in luggage conveyor systems, in particular at airports. The transport systems according to the invention can be used in luggage conveyor systems, in particular at airports.

BRIEF DESCRIPTION OF THE DRAWINGS

Exemplary embodiments of the invention will be described on the basis of FIGS. 1 through 3. The detailed descriptions of these concrete exemplary embodiments also produce additional general features and advantages of the present invention.

The figures show the following.

DETAILED DESCRIPTION

Figure 1:
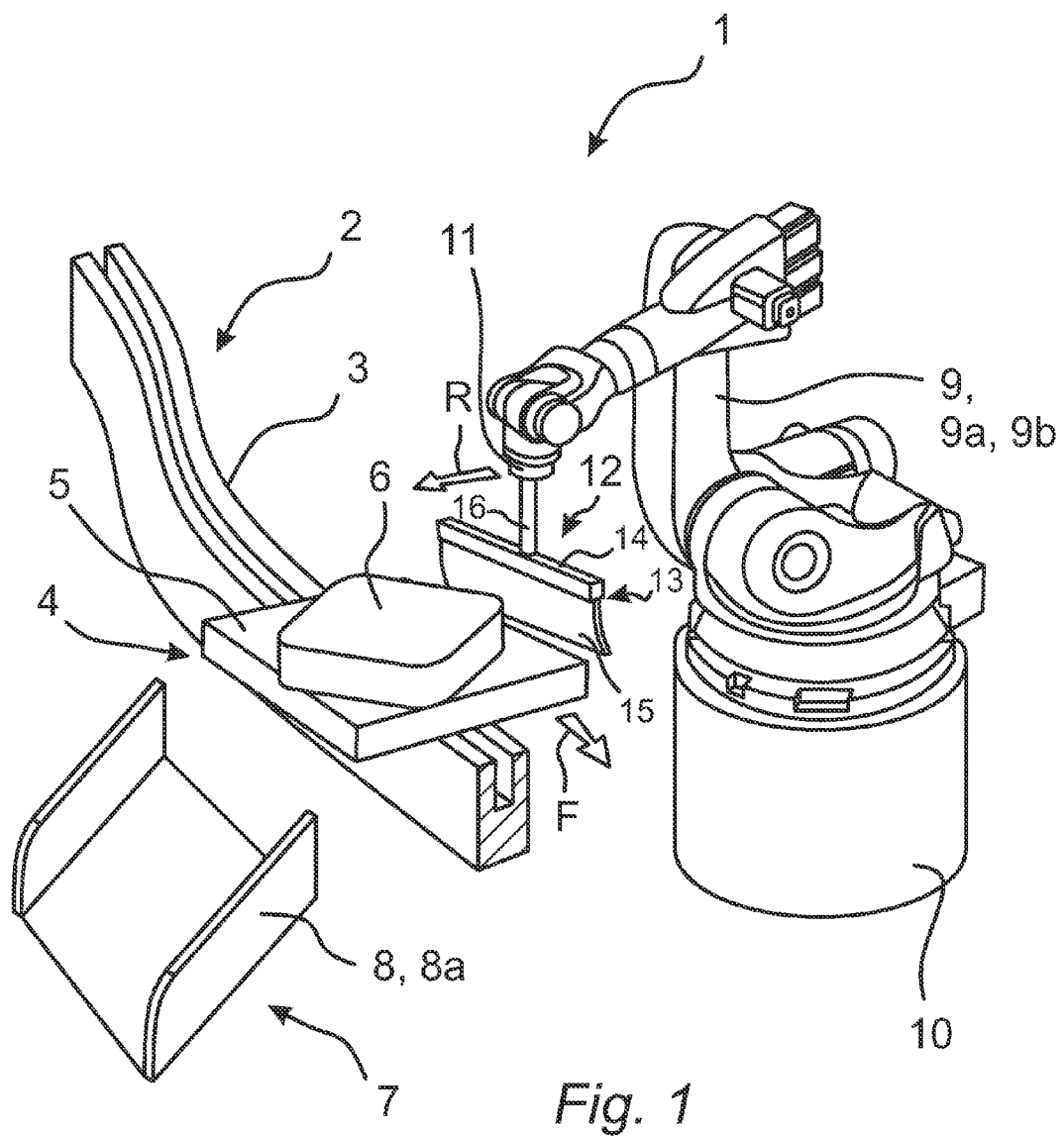
FIG. 1 a perspective view of a transport system for piece goods, having a conveyor system and a piece goods carrier, as well as a stationary manipulator as an unloading device.

FIG. 1 depicts one embodiment of a transport system 1 based on a short segment of a conveyor system 2. Conveyor system 2 has a conveying path 3, along which as an example a single one of a plurality of piece goods carriers 4 is movably supported. Piece goods carrier 4 is shown schematically with a rectangular support floor 5. Piece goods carrier 4 can be designed differently, however, depending on the piece goods 6 to be transported. For example, piece goods carrier 4 can also have in particular a round or circular contour and/or a dish-shaped floor 5 instead of a flat support floor, or may also be shaped for example as a tub, luggage tray or container. Preferably, piece goods carrier 4 is movable along conveying path 3, but otherwise is rigidly mounted, i.e., is of non-pivotable, non-tiltable design. FIG. 1 shows the section of conveying path 3 in the area of an unloading point 7. In the area of unloading point 7, a removal device 8 in the exemplary version of an unloading slide 8a is shown. A freely programmable manipulator 9a as an unloading device 9 in the form of an industrial robot 9b is placed at unloading point 7.

In the embodiment shown in FIG. 1, by way of example industrial robot 9b is positioned in a fixed location on a base 10 as stationary manipulator 9a. However, manipulator 9a or industrial robot 9b can also be attached directly to the floor. The depicted industrial robot 9b is designed as an articulated-arm robot having six axes, so that a flange 11 of industrial robot 9b is movable in a straight line in all three spatial directions and rotationally in all three spatial directions. A clearing tool 12 is attached to flange 11. In the depicted exemplary embodiment, clearing tool 12 is designed to clear or push off piece goods 6 in a direction R transverse to the transport direction F of conveying path 3 of conveyor system 2. Instead of a gripper with form-fitted operation, clearing tool 12 clears piece goods 6 off of piece goods carrier 4 by a sliding motion. Clearing tool 12 can have a slide 13 for that purpose, as shown. Slide 13 can extend over the entire width of piece goods carrier 4. Slide 13 can have a height that is adapted to the height of the piece goods 6 being transported, or in particular may have the same height as the latter. Slide 13 can be designed rigidly, or flexibly, as indicated in FIG. 1. A flexible design of slide 13 enables slide 13 to adapt elastically or fit snugly to the floor of piece goods carrier 4, and possibly to the shape of piece goods 6. The motion of the manipulator can also be adapted to the shape of the piece goods carrier.

Thus for example, with a dish-shaped piece goods carrier the manipulator can execute an arc-shaped or curving motion, which is oriented to the shape of the piece goods carrier. Flexibility of slide 13 can be achieved for example by pre-stressed, rotatable supporting of a rigid plate on a holder 14, or by firmly clamping an elastic lip 15 to holder 14, as indicated in FIG. 1. Holder 14 can be connected to flange 11 of manipulator 9a or industrial robot 9b directly, or through a connecting element, as shown.

Figure 2:
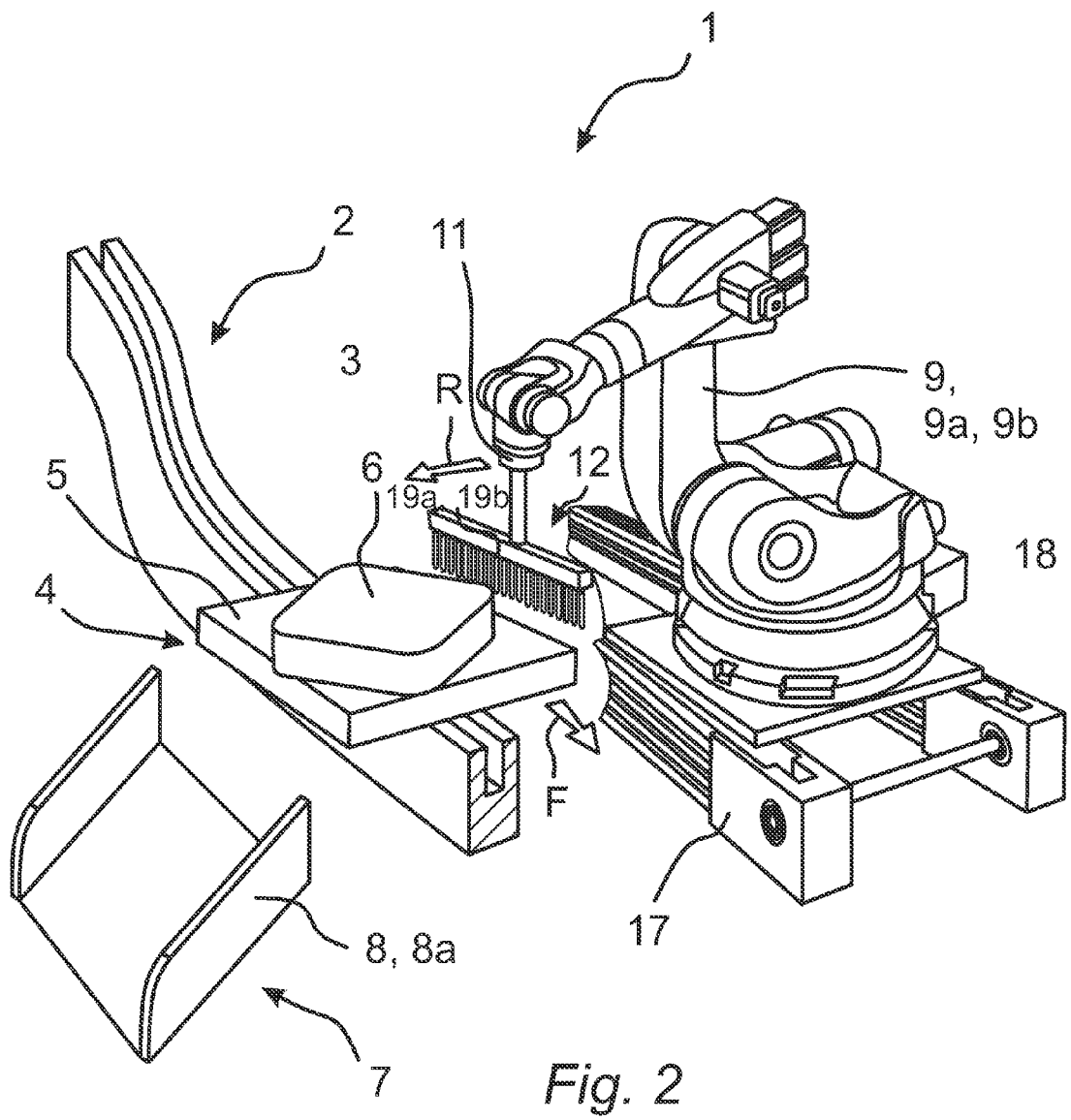
FIG. 2 a perspective view of a transport system for piece goods, having a conveyor system and a piece goods carrier, as well as a manipulator movable on a linear axis as an unloading device.

In the embodiment according to FIG. 2, manipulator 9a or industrial robot 9b is not attached immovably, but rather is movably supported on a linear axis 17. Linear axis 17 provides an additional degree of freedom, in order to be able to move or position the flange with clearing tool 12 attached thereto. In a special embodiment, a carriage 18 of linear axis 17 is movable along a straight path. The path can run in particular parallel to the transport direction F of conveying path 3 of conveyor system 2 in a section in the area of unloading point 7. By means of linear axis 17, the manipulator 9a or industrial robot 9b attached to carriage 18 can be moved in particular synchronously with the motion of piece goods carrier 4.

In the embodiment according to FIG. 2, a clearing tool 12 according to the design as shown in FIG. 1 and described in the associated description can be used. Alternatively, an alternative clearing tool 12 can be used, for example as depicted in FIG. 2. The clearing tool 12 shown in FIG. 2 has a plurality of tines 19a or bristles 19b spaced at a distance from each other, instead of a continuous elastic lip 15. The tines 19a can be rigidly attached, or pre-tensioned and spring-mounted on holder 14. The bristles 19b can have elastic characteristics, and in particular can be made of inherently elastic material. In this case the bristles 19b can be rigidly attached to holder 14, or can be movably mounted on holder 14, in particular pre-tensioned and elastically. The tines 19a and/or bristles 19b can be of equal or differing lengths, and in particular their lengths can be matched to the shape of support floor 5 of piece goods carrier 4. The elastic hardness of the tines 19a and/or bristles 19b can also be adapted to the piece goods 6.

Figure 3:
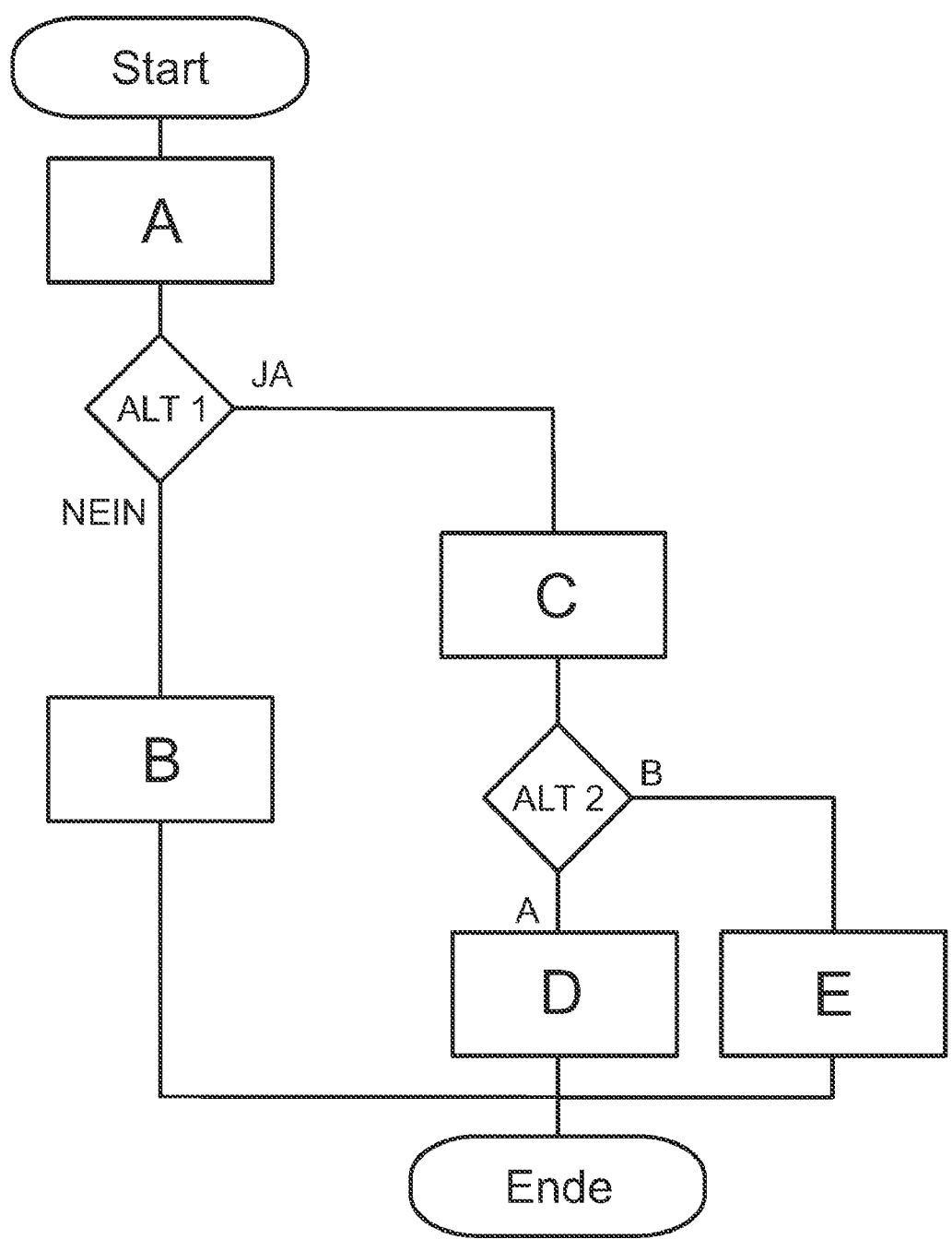
FIG. 3 a schematic depiction of the method according to the invention for unloading piece goods, with various designs for the motion of the manipulator.

FIG. 3 shows a schematic depiction of the method according to the invention for unloading piece goods, with various designs for the motion of the manipulator.

One method according to the invention for unloading piece goods 6 from a piece goods carrier 4 of a conveyor system 2 begins with a step A, in which piece goods 6 located on at least one piece goods carrier 4 of conveyor system 2 are transported to unloading point 7.

In the first alternative ALT1, in the event that piece goods carrier 4 comes to a stop (ALT1, NEIN) in the area of unloading point 7, according to step B piece goods 6 are cleared from stationary piece goods carrier 4 by means of a clearing tool 12, which is guided by the freely programmable manipulator 9a positioned at unloading point 7.

In the first alternative ALT1, in the event that piece goods carrier 4 is in motion (ALT1, JA) in the area of unloading point 7, in step C piece goods 6 are cleared off by clearing tool 12 by means of a motion of manipulator 9a that is synchronized with the motion of piece goods carrier 4, either in the case of alternative ALT2A according to step D by actuating the axes of manipulator 9a, or in the case of alternative ALT2B according to step E by actuating the motion of a linear axis 17 on which manipulator 9a is movably supported.

Clearing of piece goods 6 by clearing tool 12 by means of a motion of manipulator 9a that is synchronized with the motion of piece goods carrier 4 in step C can also be accomplished by a superimposed motion of actuating the axes of manipulator 9a according to step D with actuating the motion of a linear axis 17 on which manipulator 9a is movably supported, according to step E.

The invention claimed is:

1. A transport system for piece goods, comprising:
 a conveyor for moving the piece goods along a conveying path;
 an unloading device including a programmable, multi-axis manipulator positioned at an unloading point, wherein said piece goods are removed from said conveyor at said unloading point by said unloading device; and
 a clearing tool operatively coupled to said multi-axis manipulator of said unloading device;
 said clearing tool moved relative to said conveyor by said multi-axis manipulator to thereby discharge a piece good therefrom,
 wherein movement of said clearing tool includes a directional component transverse to the direction of movement of the conveying path and a directional component in the direction of movement of the conveying path.

2. The transport system of claim 1, further comprising:
 at least one carrier on said conveyor for supporting the piece goods moving along said conveying path;
 said unloading device removing piece goods from said carrier at said unloading point.

3. The transport system of claim 2, wherein the clearing tool discharges the piece good from the at least one carrier by a sliding motion.

4. The transport system of claim 1, wherein said manipulator actuates said clearing tool in a direction generally transverse to said conveying path.

5. The transport system of claim 1, wherein movement of said clearing tool by said manipulator is synchronized with movement of piece goods by said conveyor, whereby piece goods are discharged from said conveyor while moving along said conveying path.

6. The transport system of claim 1, wherein said clearing tool is configured to conform to a shape of the piece goods.

7. The transport system of claim 1, further comprising:
 at least one carrier on said conveyor for supporting the piece goods moving along said conveying path;
 wherein said clearing tool is configured to conform to the shape of said at least one carrier.

8. The transport system of claim 1, further comprising:
 at least one carrier on said conveyor for supporting the piece goods moving along said conveying path;
 wherein movement of said clearing tool by said manipulator is adapted to the shape of said at least one carrier.

9. The transport system of claim 1, wherein said unloading device is responsive to information related to a characteristic of the piece goods to alter at least one operating parameter of the unloading device in response to the information.

10. The transport system of claim 9, wherein said at least one operation parameter is at least one of a travel path, an acceleration, or a velocity of said clearing tool.

11. A transport system for piece goods, comprising:
 a conveyor for moving the piece goods along a conveying path;
 an unloading device including a programmable, multi-axis manipulator positioned at an unloading point;
 a clearing tool operatively coupled to said multi-axis manipulator of said unloading device;
 a carriage adapted for movement along a path substantially parallel to said conveying path proximate said unloading point;
 said unloading device supported on said carriage for movement therewith;
 wherein said piece goods are removed from said conveyor at said unloading point by said unloading device,
 wherein said clearing tool is moved relative to said conveyor by said multi-axis manipulator to thereby discharge a piece good therefrom; and
 wherein movement of said unloading device by said carriage is synchronized with movement of the piece goods by said conveyor, such that piece goods are discharged from said conveyor while moving along said conveying path.

12. A method for unloading piece goods from a piece goods carrier of a conveyor system at an unloading point using a transport system, comprising:
 moving at least one piece good on a conveyor along a conveying path to an unloading point; and
 discharging the piece good from the conveyor at the unloading point by moving a clearing tool with a multi-axis manipulator to engage the piece good, wherein movement of said clearing tool includes a directional component transverse to the direction of movement of the conveying path and a directional component in the direction of movement of the conveying path.

13. The method of claim 12, wherein the multi-axis manipulator moves the clearing tool to engage the piece good while the piece good is moving along the conveying path.

14. The method of claim 13, further comprising:
 actuating the axes of the manipulator to synchronize movement of the clearing tool by the manipulator with movement of the piece good along the conveying path.

15. The method of claim 13, further comprising:
 detecting at least one characteristic of the piece good;
 moving the clearing tool with the manipulator in accordance with at least one travel condition in response to the detected characteristic.

16. The method of claim 15, wherein the travel condition comprises at least one of a travel path, an acceleration, or a velocity of the clearing tool.

17. The method of claim 16, further comprising:
 changing the at least one of travel condition in response to the detected characteristic.

18. The method of claim 15, wherein the detected characteristic is at least one of a shape, a dimension, a mass, or an impact sensitivity associated with the piece good.

19. The method of claim 12, wherein the clearing tool discharges the piece good from the conveyor by a sliding motion.

20. A method for unloading piece goods from a piece goods carrier of a conveyor system at an unloading point using a transport system, comprising:
 moving at least one piece good on a conveyor along a conveying path to an unloading point;
 discharging the piece good from the conveyor at the unloading point by moving a clearing tool with a multi-axis manipulator to engage the piece good;
 wherein the multi-axis manipulator is supported on a carriage adapted for movement along a path substantially parallel to the conveying path proximate the unloading point;
 wherein the multi-axis manipulator moves the clearing tool to engage the piece good while the piece good is moving along the conveying path; and
 moving the manipulator with the carriage in synchronization with movement of the piece good along the conveying path.

* * * * *

UNITED STATES PATENT AND TRADEMARK OFFICE
CERTIFICATE OF CORRECTION

| | | |
|---|---|---|
| PATENT NO. | : 8,151,969 B2 | Page 1 of 1 |
| APPLICATION NO. | : 12/903647 | |
| DATED | : April 10, 2012 | |
| INVENTOR(S) | : Albrecht Hoene | |

It is certified that error appears in the above-identified patent and that said Letters Patent is hereby corrected as shown below:

Cover Page, column 1, insert Item 30:
           --(30)      Foreign Application Priority Data
                Oct. 13, 2009 (DE)..........10 2009 049 174.0--

Signed and Sealed this
Twenty-sixth Day of June, 2012

David J. Kappos
*Director of the United States Patent and Trademark Office*